United States Patent
Lynch

(10) Patent No.: US 9,438,595 B2
(45) Date of Patent: Sep. 6, 2016

(54) NETWORK RESOURCE ACCESS CONTROL METHODS AND SYSTEMS USING TRANSACTIONAL ARTIFACTS

(75) Inventor: Thomas W. Lynch, Galveston, TX (US)

(73) Assignee: Cheng Holdings, LLC, Wilmington, DE (US)

( * ) Notice: Subject to any disclaimer, the term of this patent is extended or adjusted under 35 U.S.C. 154(b) by 1047 days.

(21) Appl. No.: 13/592,212

(22) Filed: Aug. 22, 2012

(65) Prior Publication Data
US 2012/0317626 A1 Dec. 13, 2012

Related U.S. Application Data

(63) Continuation of application No. 11/860,435, filed on Sep. 24, 2007, now Pat. No. 8,260,721.

(51) Int. Cl.
G06F 21/00 (2013.01)
H04L 29/06 (2006.01)
G06F 21/31 (2013.01)

(52) U.S. Cl.
CPC .............. *H04L 63/10* (2013.01); *G06F 21/31* (2013.01); *G06F 2221/2101* (2013.01); *G06F 2221/2129* (2013.01); *H04L 2463/101* (2013.01)

(58) Field of Classification Search
USPC ........................................... 705/75
See application file for complete search history.

(56) References Cited

U.S. PATENT DOCUMENTS

| 7,861,922 B2 | 1/2011 | Lee et al. |
| 2004/0267672 A1 | 12/2004 | Gray et al. |
| 2005/0192877 A1* | 9/2005 | Smith ............ G06Q 10/10 705/34 |
| 2005/0234860 A1 | 10/2005 | Roever et al. |
| 2009/0083739 A1 | 3/2009 | Lynch |
| 2009/0198619 A1 | 8/2009 | Tripunitara et al. |

FOREIGN PATENT DOCUMENTS

WO WO-0146917 6/2001

* cited by examiner

*Primary Examiner* — Jamie Kucab
(74) *Attorney, Agent, or Firm* — Dorsey & Whitney LLP

(57) ABSTRACT

Methods and systems are provided for use with digital data processing systems to control or otherwise limit access to networked resources based, at least in part, on transactional artifacts and/or derived artifacts.

9 Claims, 4 Drawing Sheets

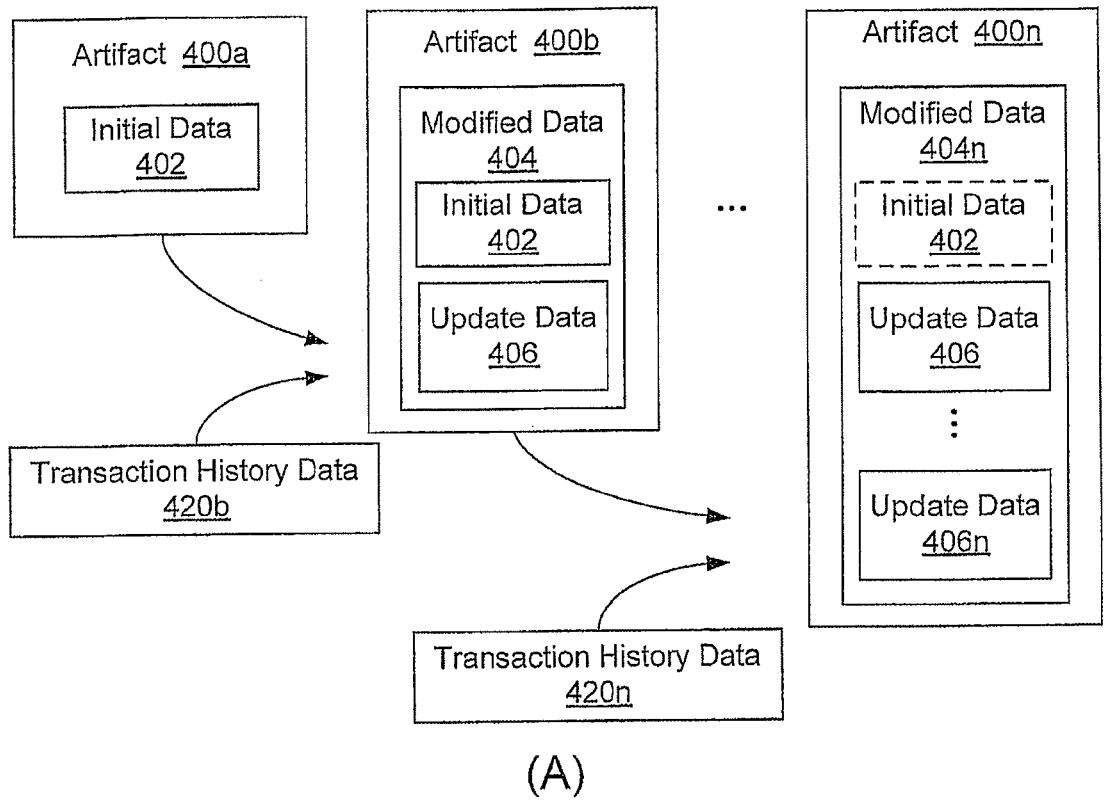
(A)
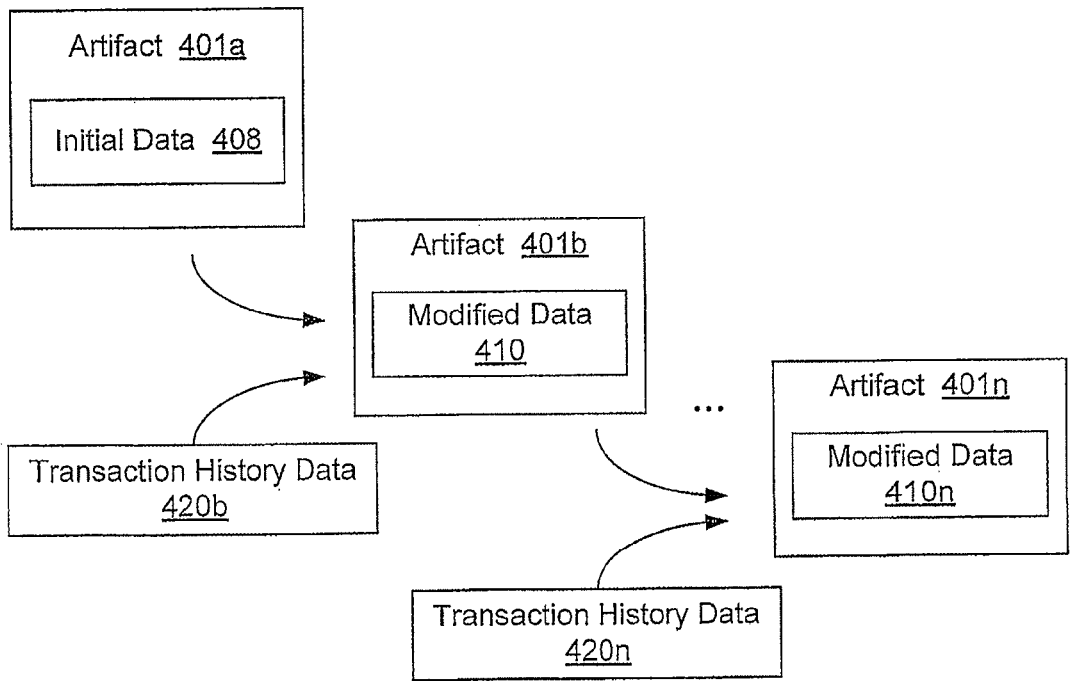
(B)
Fig. 4

NETWORK RESOURCE ACCESS CONTROL METHODS AND SYSTEMS USING TRANSACTIONAL ARTIFACTS

CROSS-REFERENCE TO RELATED APPLICATION(S)

This application is a continuation application of U.S. patent application Ser. No. 11/860,435, filed Sep. 24, 2007 and issued as U.S. Pat. No. 8,260,721 on Sep. 4, 2012. The aforementioned application and patent are incorporated herein by reference, in their entirety, for any purpose.

BACKGROUND

The subject matter disclosed herein relates to digital data processing systems and data transferring, and more particularly to methods and systems for controlling or limiting access by computers on at least one network to other resources available on the network based, at least in part, on transactional artifacts.

INFORMATION

The demand to access or otherwise transfer data (e.g., download digital content) using networked data processing systems (e.g., network resources, computers and other like devices) continues to increase, especially as the capability of the devices and supporting communication infrastructure continues to evolve. Digital content service providers continue to invest significant resources to meet this demand, and to further interest in the availability of such digital content. While some service providers allow users unfettered access to all or portions of such digital content, other service providers seek to control or otherwise limit access to all or portions of such digital content. As used herein, the term digital content is intended to represent any digital content that may be represented using digital data.

When desired, a service provider may implement digital content access control using one or more digital rights management techniques. For example, some service providers require users to enter into some type of transactional relationship with the service provider. The relationship may, for example, include an agreement between a service provider and a user regarding certain rights associated with the digital content and possibly certain privileges or responsibilities that one or both parties may have as part of the relationship. With some relationships, for example, a service provider may require the user to provide some form of compensation for accessing digital content. For example, a user may be required to pay a subscription fee, a one time fee, or the like, to the service provider.

Unfortunately, often times the protections implemented by a service provider to protect digital content may become compromised, either through intentional or unintentional actions of others. For example, some users act contrary to the relationship by improperly sharing a security token, or other information or data that allows other users to gain unauthorized access to the digital content associated with the relationship.

BRIEF DESCRIPTION OF THE DRAWINGS

Non-limiting and non-exhaustive embodiments will be described with reference to the following figures, wherein like reference numerals refer to like parts throughout the various figures unless otherwise specified.

FIGS. 4(A) and (B) are block diagrams illustrating exemplary transactional history artifacts or derived artifacts as modified over time in accordance with certain embodiments.

DETAILED DESCRIPTION

Embodiments of a system and method for use in providing digital rights management based on fraud detection using transactional history artifacts and/or derived artifacts are described. In the following description, numerous specific details are set forth. However, it is understood that embodiments of the claimed subject matter may be practiced without these specific details. In other instances, well-known circuits, structures and techniques have not been shown in detail in order not to obscure the understanding of this description. The embodiments may, for example, be practiced using hardware, firmware, software, or any combination thereof.

Reference throughout this specification to "one embodiment" or "an embodiment" means that a particular feature, structure, or characteristic described in connection with the embodiment is included in at least one embodiment of the claimed subject matter. Thus, the appearances of the phrases "in one embodiment", "in certain embodiments", or "in an embodiment" in various places throughout this specification are not necessarily all referring to the same embodiment. Furthermore, the particular features, structures, or characteristics may be combined in any suitable manner in one or more embodiments.

Figure 1:
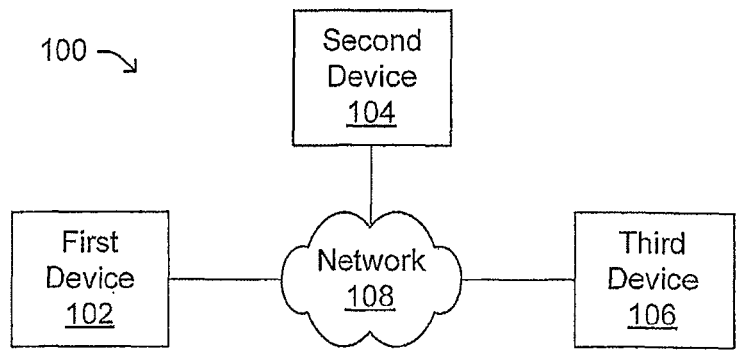
FIG. 1 is a block diagram illustrating an exemplary system having a plurality of devices operatively coupled through a network in accordance with an embodiment.

FIG. 1 is a block diagram illustrating an exemplary system 100 having a plurality of devices including a first device 102, a second device 104 and a third device 106, which are operatively coupled through a network 108, according to an embodiment.

In this example, devices 102, 104 and 106 are intended to represent one or more devices, machines, computing platforms, or the like that are suitable or otherwise adaptable for interacting with other such devices through network 108. Thus, by way of example but not limitation, one or more of devices 102, 104, and 106 may include a computer (e.g., a personal computer, a workstation, a server, a mainframe, or the like), a portable device (e.g., a personal digital assistant, mobile telephone, MP3 player), a portable artifact device (e.g., a smart card or the like), or a machine or appliance (e.g., a peripheral device, a set-top box, a vehicle, or the like).

In this example, network 108 is intended to represent one or more networks or network resources that are suitable or otherwise adaptable for providing the requisite data communications between the devices in system 100. Thus, by way of example but not limitation, network 108 may provide one or more wired or wireless communication connections and include one or more communication devices operatively coupled together to carry data between applicable devices. In certain embodiments, for example, network 108 may include one or more local area networks, wide area networks, an intranet, the Internet, or a telephone system.

In FIG. 1, devices 102, 104 and 106 may be operatively adapted (e.g., programmed or otherwise configured) to provide or receive certain services associated with the distribution of or otherwise sharing of digital content through network 108. Devices 102, 104 and 106 may each be associated with a particular user (e.g., an individual, a group, an entity, a company, a service provider, or the like) and operatively adapted to provide certain functions while communicating with one or more of the other devices.

Accordingly, two or more of these devices may be associated with users having a transactional relationship. By way of example but not limitation, first device 102 and second device 104 may be associated with respective users having a transactional relationship wherein first device 102 provides digital content to second device 104. For example, first device 102 may include a server computer that is adapted for a service provider to selectively provide access to digital content to second device 104 through network 108, and second device 104 may include a client computer that is adapted for a primary user to request and receive or otherwise access such digital content through network 108.

Continuing with this exemplary transactional relationship, third device 106 may include a client computer that is associated with a non-primary user, e.g., a user other than the primary user. Similar to second device 104, third device 106 may be adapted to request and receive or otherwise access such digital content through network 108 while purporting to be associated with the primary user. In other words, in this example, while second device 104 may be authorized under the transactional relationship to request and receive or otherwise access the digital content from first device 102, third device 106 is not so authorized. System 100 may be arranged to identify and possibly prevent such unauthorized access or attempts thereof based on fraud detection using transactional history artifacts.

In an embodiment, first device 102 (e.g., a service provider) and second device 104 (e.g., a primary user) establish a transactional relationship by, at least in part, initially establishing a process through which at least second device 104 is subsequently able to convince first device 102 that second device 104 is properly associated with the primary user. For example, second device 104 may generate and provide a "credential" to first device 102 that first device 102 is able to compare to or otherwise test with a "verifier" that is generated by first device 102.

The credential and verifier may, for example, be based on artifacts that are maintained by the applicable devices and updated or otherwise modified based on a transactional history associated with the relationship.

In the example presented above, if third device 106 is used to gain unauthorized access, for example, by providing the appropriate credential for second device 104 to first device 102, then as a result of at least one of the transactions associated with this unauthorized access the artifact that is maintained by first device 102 will differ from the artifact that is maintained by second device 104 in some manner since second device 104 was not involved in the transaction(s) associated with this unauthorized access. Consequently, a subsequent credential that is generated and presented by second device 104 will fail to match (or otherwise satisfy the test based on) a subsequently generated verifier.

As used herein, the term "transaction" may represent one or more data exchanges between the first and second device that are associated with the transactional relationship or associated with the communication techniques supportive of the transactional relationship. By way of example but not limitation, a transaction may include a purchase, a download, an upload, one or more messages, a portion of a message, a transmitted or received packet or the like per a data transmission process, etc.

Figure 2:
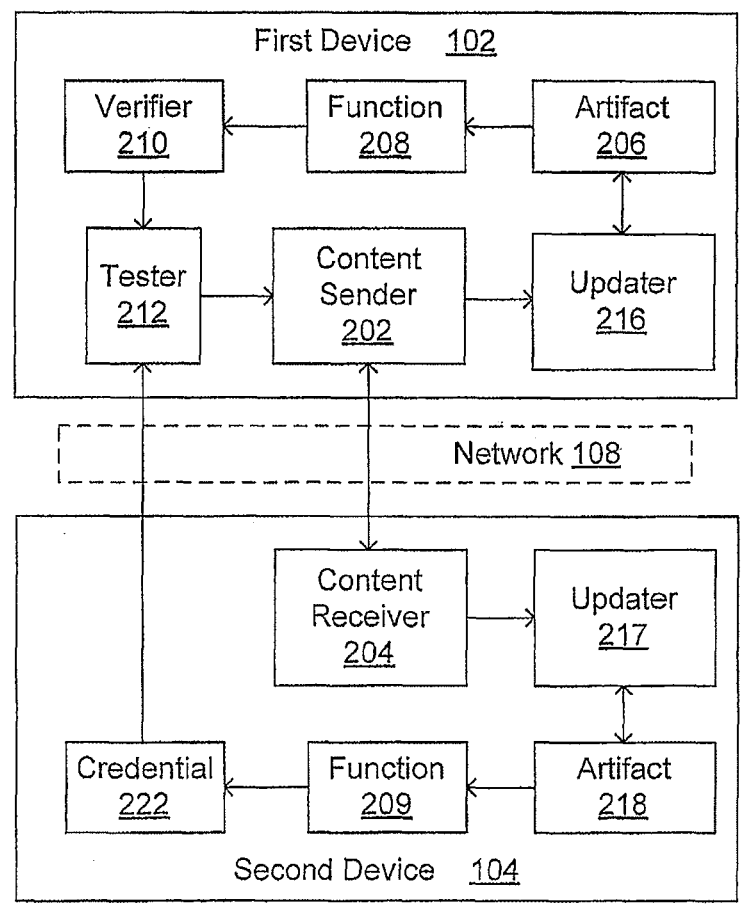
FIG. 2 is a block diagram illustrating certain exemplary functions of a first device and a second device having a transactional relationship and adapted to employ fraud detection using transactional history artifacts or derived artifacts, in accordance with an embodiment.

Reference is now made to FIG. 2, which is a block diagram illustrating certain exemplary functions of first device 102 and second device 104, having a transactional relationship there between, in accordance with an embodiment.

As illustrated in FIG. 2, first device 102 may include a content sender 202 and second device 104 may include a content receiver 204. Content sender 202 may be configured to selectively provide digital content to content receiver 204, or otherwise provide content receiver 204 access to such digital content, as part of a transaction process. Such a transaction process may be initiated by content sender directly or indirectly, for example, in response to a request from content receiver 204. When a transaction process is initiated content sender 202 may withhold the digital content or access thereto until the content receiver 204 has been authenticated as likely being associated with the transactional relationship.

To check that fraud has not occurred, first device 102 may include an artifact 206 that may include information that is intended to be known only by the parties properly associated with the transactional relationship. At least a portion of artifact 206 may be processed by at least one function 208 to produce a corresponding verifier 210. Second device 104 may include an artifact 218 that may include information that is intended to be known only by the parties properly associated with the transactional relationship. At least a portion of artifact 218 may be processed by at least one function 209 to produce a credential 222.

As shown in FIG. 2, in one embodiment, credential 222 may be provided through network 108 to first device 102 and provided along with verifier 210 to a tester 212. In other embodiments (not shown), for example, tester 212 may be provided by second device 104, in which case verifier 210 may be provided through network 108 to second device 104. In still other embodiments (not shown), for example, tester 212 may be provided in another device, in which case verifier 210 and credential 222 may be provided through network 108 to the other device.

Tester 212 may compare or otherwise consider credential 222 and verifier 210 to determine if the transaction process should continue such that the digital content is provided to or otherwise accessed by second device 104. For example, tester 212 may indicate or otherwise inform content sender 202 or content receiver 204 that the transactional process appears to be proper and as such may continue, or conversely that the transactional process appears to be improper and as such may not continue.

In certain embodiments, content sender 202 may provide or otherwise identify transaction history data that is associated with a transactional process to an updater 216. At least a portion of the transaction history data may then be used by updater 216 to modify artifact 206. In this manner, artifact 206 may be modified often to reflect the latest transactional history. Artifact 206 may be modified by updater 216, for example, prior to starting, during, or upon completing a transaction process.

Similarly, in certain embodiments, content receiver 204 may provide or otherwise identify transaction history data that is associated with a transactional process to an updater 217. At least a portion of the transaction history data may then be used by updater 217 to modify artifact 218. In this manner, artifact 218 may be modified often to reflect the latest transactional history. Artifact 218 may be modified by updater 217, for example, prior to starting, during, or upon completing a transaction process.

In certain implementations, for example, updater 216 and/or updater 217 may be configured to increment or otherwise modify a artifact in some manner, sequence or otherwise modify a artifact as through it were the seed for a sequence (e.g. if it were a CRC seed or the like), and/or encrypt a artifact. In certain implementations, for example, updater 216 and/or updater 217 may be configured to use an artifact as a state in a state machine in some manner (e.g., the updater may change to the next state). In certain implementations, for example, updater 216 and/or updater 217 may be configured to use an artifact as a set of residues in a polynomial generator. In certain implementations, for example, updater 216 and/or updater 217 may be configured to use an artifact as a seed in a pseudo random generator.

It should be recognized that with this transaction history based fraud detection, in certain embodiments depending upon the design, updaters 216 and 217 may perform the same, substantially the same or different functions, artifacts 206 and 218 may include the same, substantially the same or different data or objects, functions 208 and 209 may perform the same, substantially the same or different mathematical or other like operations, or verifier 210 and credential 222 may include the same, substantially the same or different data or objects. Tester 212 may be adapted to account for such similarities or differences and to determine if the transactional process appears to be proper and as such may continue, or conversely that the transactional process appears to be improper and as such may not continue.

In certain embodiments, verifier 210 and credential 222 may include data associated with the respective user, data associated with the respective device, or a combination thereof. In certain embodiments, artifacts 206 and 218, or verifier 210 and credential 222 may, for example, be based at least in part on one or more digital certificates from one or more trusted certification authorities.

In certain embodiments, for example, the transaction process may include one or more transactions wherein information is exchanged between content sender 202 and content receiver 204. As a result transaction history data may, for example, include or otherwise be based on information associated with such data exchange such as transaction identifier data, message identifier data, substantially unique identifier data, substantially random identifier data, time data, timestamp data, user identifier data, service provider identifier data, network communication related data, cryptographic data, public or private key related data, security data, correction code data, product identifier data, digital content identifier data, digital content data, login data, account name data, password related data, media access control address data, network address data, relationship identifier data, and payment related data, or the like.

In certain embodiments, for example, function 208 or function 209 may include one or more mathematical functions such as a unity function, a hash function, a shift register function, or the like. Function 208 or function 209 may include one or more encryption functions, for example, as may be desired to better protect the verifier or credential, respectively, when provided through network 108. Functions 208 and 209 may be the same or different functions.

It is recognized that in accordance with certain aspects, that any pair of relations may be used for as a credential generating function, and as a verifier generating function, as long as sufficiently a reliable tester function exists for the results of applying this a pair of relations.

Figure 3:
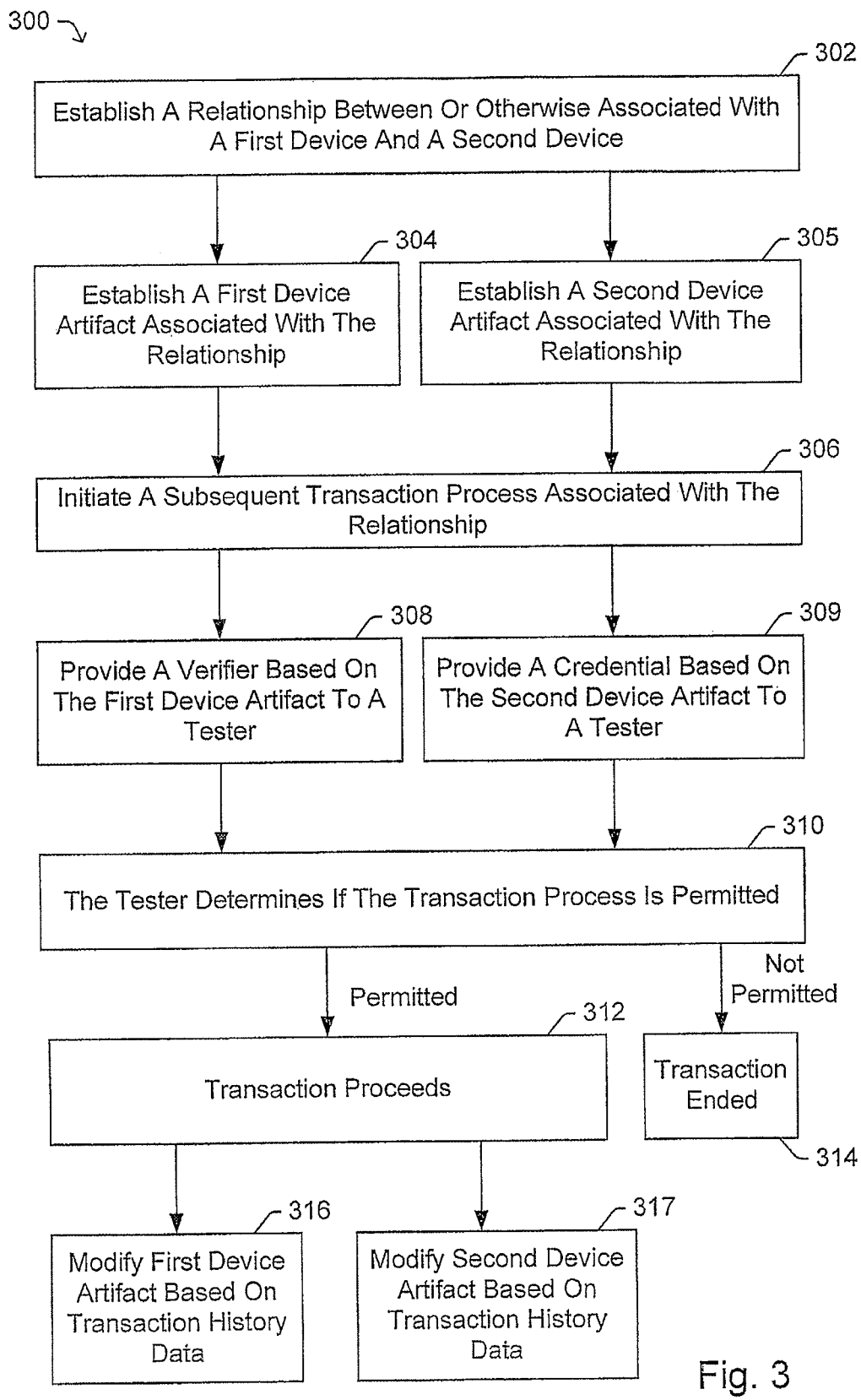
FIG. 3 is a flow diagram illustrating an exemplary fraud detection method for use with a first device and a second device having a transactional relationship in accordance with an embodiment.

Attention is now drawn to FIG. 3, which is a flow diagram illustrating an exemplary process 300 in accordance with one embodiment, and may, for example, be used in system 100 or the like.

In 302 a relationship may be established between or otherwise associated with at least a first device and a second device. In 304 a first device artifact associated with the relationship may be established. In 305 a second device artifact associated with the relationship may be established. In 306 a subsequent transaction process associated with the relationship may be initiated. In 308 a verifier based on the first device artifact may be provided to a tester. In 309 a credential based on the second device artifact may be provided to the tester. In 310 the tester may determine if the transaction process is permitted. If the tester in 310 determines that the transaction process is permitted, then in 312 the transaction may proceed. If the tester in 310 determines that the transaction process is not permitted, then in 314 the transaction may be ended. In 316 the first device artifact may be modified based on transaction history data. In 317 the second device artifact may be modified based on transaction history data.

In certain embodiments, for example, in 302 the relationship may be a transactional relationship wherein the first device is associated with a service provider and the second device is associated with a primary user and subsequent transaction processes may allow the second device to access downloadable digital content provided by or otherwise made accessible by the first device in return for a payment in accordance with the relationship.

In certain embodiments, for example, as established in 304 and 305 the first and second device artifacts may be the same, substantially the same and may include data associated with information that is intended to be known only by the parties properly associated with the transactional relationship. By way of example but not limitation, one or both of the established first and second device artifacts may include data associated with login account name or password information, personal identification number, biometric information, device identifier or related information, network address identification or related information, relationship identification or related information, user identification or related information, payment related information, asymmetric or symmetric cryptography keys or related encryption information, random or pseudo random data information, or the other like data.

In certain embodiments, for example, in 306 a subsequent transaction process associated with the relationship may be initiated by either the first device or the second device, or even by one or more other devices that may be adapted to initiate such a transaction. By way of example but not limitation, another device may be adapted to initiate the subsequent transaction because it relies on portions of process 300 and the relationship between the first and second devices to complete or otherwise assist in performing a commercial transaction.

In certain embodiments, for example, in 308 the verifier may be generated by processing at least a portion of the first device artifact using one or more functions. In certain embodiments, for example, the verifier may only include data, while in other embodiments, the verifier may be an object that includes data and defines associated procedures or the like relating thereto.

In certain embodiments, for example, in 309 the credential may be generated by processing at least a portion of the second device artifact using one or more functions. In certain embodiments, for example, the credential may only include data, while in other embodiments, the credential may be an object that includes data and defines associated procedures or the like relating thereto.

In certain embodiments, for example, in 308 or 309 the tester may be provided by the first device, the second device, one or more other devices, or any combination thereof.

In certain embodiments, for example, in 310 the tester may simply compare the verifier and credential or may further process one or both as needed. The tester may also base its determination on other information. The other information may be associated with the relationship, the first device, the second device, the subsequent transaction, previous transaction history, or any other available information that may be useful in determining if the transaction should be permitted. In certain embodiments, the tester may also be adapted to decrypt or otherwise initiate the decryption or regeneration of a verifier or credential.

In certain embodiments, for example, in 312 the transaction may, for example, proceed to completion or to some other pre-completion point depending on the transaction.

In certain embodiments, for example, in 314 the transaction may be ended by initiating another process, such as a recovery process or the like.

In certain embodiments, for example, in 316 the first device artifact may be modified based on transaction history data by including at least a portion of the transaction history data in the first device artifact, including other data based at least in part on at least a portion of the transaction history data in the first device artifact, or replacing at least a portion of the first device artifact with at least a portion of the transaction history data or other data based at least in part on at least a portion of the transaction history data.

In certain embodiments, for example, in 317 the second device artifact may be modified based on transaction history data by including at least a portion of the transaction history data in the second device artifact, including other data based at least in part on at least a portion of the transaction history data in the second device artifact, or replacing at least a portion of the second device artifact with at least a portion of the transaction history data or other data based at least in part on at least a portion of the transaction history data.

Reference is now made to FIGS. 4(A) and 4(B), which are block diagrams illustrating two exemplary artifacts 400 and 401, respectively, that may, for example, be modified over time based on at least the transaction history.

In FIG. 4(A), by way of example but not limitation, artifact 400 is illustrated at three different times, namely, artifact 400a represents an initial artifact, artifact 400b represents the artifact following at least one transaction, and artifact 400n represents the artifact following one or more subsequent transactions. Artifact 400a includes at least initial data 402. Initial data 402 may include, for example, information that is intended to be known only by the parties properly associated with the transactional relationship. As a result of a transaction, artifact 400a may be modified using at least a portion of transaction history data 420b to produce artifact 400b. Artifact 400b may include modified data 404 that may include initial data 402 or at least a portion thereof arid update data 406.

Similarly, at some later point in time, as a result of at least one subsequent transaction, an artifact 400n may be likewise produced using a most recent artifact and at least a portion of transaction history data 420n. Artifact 400n may include modified data 404n, which may include initial data 402 or at least a portion thereof, update data 406, additional intervening update data and update data 406n. Update data 406n may be based on transaction history data 420n, for example.

As illustrated, the exemplary artifact maintenance or modification scheme in FIG. 4(A) may continue to increase the amount of data in the artifact over time. Thus, it is recognized that the amount of data in the artifact may be limited in some manner that may require that some data be removed or replaced over time. To illustrate this possibility in this example, initial data 402 in modified data 404n is shown in a dashed box to represent that it may be optional in certain embodiments. This is only one example, in other embodiments the initial data 402 may be maintained while other intervening update data or portions thereof are removed. For example, modified data 404n may be limited to maintaining update data associated with only a limited number of previous transactions. Such limitations may, for example, include imposing numerical limits, data size limits, time or age based limits, or the like.

In FIG. 4(B), by way of example but not limitation, artifact 401 is illustrated at three different times, namely, artifact 401a represents an initial artifact, artifact 401b represents the artifact following at least one transaction, and artifact 401n represents the artifact following one or more subsequent transactions. Artifact 401a includes at least initial data 402. As a result of a subsequent transaction, artifact 401a may be modified using at least a portion of transaction history data 420b to produce artifact 400b. Artifact 400b may include modified data 410. Modified data 410 may be based on initial data 402 or at least a portion thereof and at least a portion of transaction history data 420b. In certain embodiments modified data 410 may be based on at least a portion of a credential associated with the previous artifact, here, e.g., artifact 400a.

At some later point in time, as a result of one or more subsequent transactions, an artifact 401n may be likewise produced using a most recent artifact and at least a portion of transaction history data 420n. Artifact 400n may include modified data 410n, which may be based on at least a portion of transaction history data 420n or at least a portion of the most recent modified data. In certain embodiments modified data 410n may be based on at least a portion of a credential or a verifier.

Figure 5:
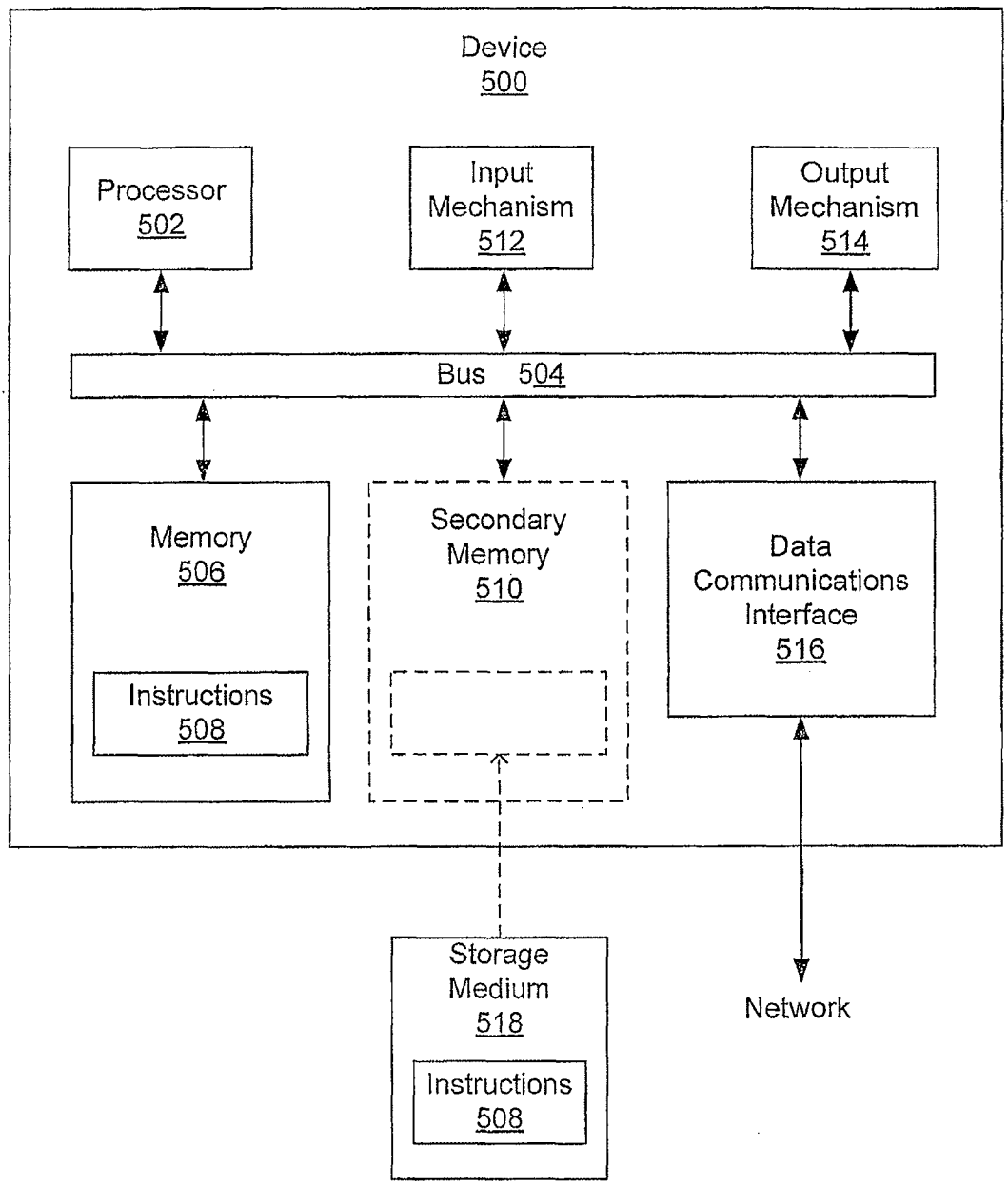
FIG. 5 is a block diagram illustrating certain components that may be included in an exemplary device in accordance with an embodiment.

FIG. 5 is a block diagram illustrating certain components that may be included in or otherwise operatively associated with an exemplary device 500 in accordance with an embodiment. Device 500 may, for example, be adapted for use as first device 102, second device 104 or third device 106, or for use with process 300.

Device 500 may include at least one processor 502 coupled to at least one bus 504, along with a memory 506, an input mechanism 512, an output mechanism 514, and a data communications interface 516.

By way of example but not limitation, processor 502 may include a central processing unit (CPU), an application specific integrated circuit (ASIC), or other like logic circuitry that executes instructions and in doing so processes data. Machine-readable instructions 508, for example, may be provided in memory 506 or in a storage medium 518. In this example, storage medium 518 may be selectively coupled to a secondary memory 510 that may be coupled to bus 504. Memory 506 may include, for example, random access memory (RAM), read only memory (ROM), flash memory, or other like solid state memory.

Secondary memory 510 may include, for example, a floppy disk drive, a hard disk drive, an optical disc drive, a tape drive, a solid state memory drive, a portable storage medium interface mechanism, a smart card reader, or the like.

Storage medium may include, for example, a magnetic data storage medium, an optical data storage medium, a solid state storage medium, a smart card, or the like.

Input mechanism 512 may include, for example, one or more input buttons or keys, a keyboard, a keypad, a pointing/selecting device such as a mouse, touchpad or the like, a microphone, or other user input device. Output device 514 may include, for example, a visual display such as one or more visible indicators, a light emitting diode (LED), a liquid crystal display (LCD), cathode ray monitor (CRT), a plasma display, a projector, or other like visual display, or an audio output device, such as, a speaker or the like.

Data communications interface 516 may include, for example, a wired or wireless network communication interface suitable for providing data communications with one or more other device through a network.

While the claimed subject matter has been described in terms of several embodiments, those of ordinary skill in the art will recognize that the claimed subject matter is not limited to the embodiments described, but can be practiced with modification and alteration within the spirit and scope of the appended claims. The description is thus to be regarded as illustrative instead of limiting.

What is claimed is:

1. A method for allowing access to access controlled network resources, the method comprising:
    receiving, with a first device associated with a service provider, a credential generated by a second device associated with a user;
    generating, with the first device, a verifier by processing a first device artifact based on a transactional history between the first device and the second device as observed by the first device;
    initiating, with the first device, a transaction process in response to a transaction request by the second device;
    comparing the credential and the verifier to determine whether to permit the transaction process; and
    allowing access to the access controlled network resources if the comparing indicates the credential and the verifier are based on a same transactional history, and
    wherein the credential is based in part on a second device artifact maintained by the second device and processed by the second device based on a transactional history between the first device and the second device as observed by the second device, and
    wherein the second device artifact is modified by the second device subsequent to a previous transaction between the user and the service provider before the credential is received by the first device for authentication during the transaction process.

2. The method of claim 1, wherein said processing the first device artifact includes updating the first device artifact using account name related data, password related data, personal identification related data, biometric information related data, device identifier related data, network address identification related data, relationship identification related data, user identification related data, payment related data, encryption related data, random related data, pseudo random related data, or combinations thereof.

3. The method of claim 1, wherein said generating the verifier includes processing the first device artifact using a first function different than a second function used by the second device to generate the credential.

4. The method of claim 3, wherein said comparing includes accounting for differences between the first function and the second function.

5. The method of claim 1, wherein said processing includes modifying the first device artifact using a first function comprising a unity function, a hash function, a shift register function, or combinations thereof.

6. The method of claim 1, wherein said processing includes encrypting the first device artifact, incrementing the first device artifact, using the first device artifact as a seed in a pseudo random generator, using the first device artifact as a state in a state machine, or using the first device artifact as a set of residues in a polynomial generator.

7. The method of claim 1, wherein the credential includes data associated with the user, data associated with the second device, or combinations thereof.

8. The method of claim 1, further comprising maintaining, with the first device, a third device artifact based on a second transactional history between the first device and a third device associated with another user as observed by the first device, and generating a second verifier based on the second transactional history.

9. The method of claim 8, further comprising:
    receiving a second credential generated by the third device, and
    denying access to the access controlled network resources if a comparison between the second credential and the second verifier indicates that the second credential is not based on a transactional history corresponding to the second transactional history.

* * * * *